(12) United States Patent  
Hosokawa

(10) Patent No.: US 9,036,982 B2
(45) Date of Patent: May 19, 2015

(54) RECORDING APPARATUS

(75) Inventor: Shuichi Hosokawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 112 days.

(21) Appl. No.: 12/968,037

(22) Filed: Dec. 14, 2010

(65) Prior Publication Data

US 2011/0142424 A1    Jun. 16, 2011

(30) Foreign Application Priority Data

Dec. 16, 2009  (JP) ................................. 2009-285563

(51) Int. Cl.
*H04N 5/76*    (2006.01)
*H04N 5/92*    (2006.01)

(52) U.S. Cl.
CPC ........................................ *H04N 5/76* (2013.01)

(58) Field of Classification Search
None
See application file for complete search history.

(56) References Cited

U.S. PATENT DOCUMENTS

| | | | |
|---|---|---|---|
| 7,747,143 B2 * | 6/2010 | DeKeyser et al. | 386/327 |
| 2002/0097326 A1 * | 7/2002 | Kuroiwa | 348/231 |
| 2004/0183912 A1 | 9/2004 | Szolyga | |
| 2005/0278631 A1 | 12/2005 | Kamio | |
| 2008/0136935 A1 * | 6/2008 | Kudo | 348/231.1 |
| 2008/0292266 A1 * | 11/2008 | Kim | 386/52 |
| 2008/0310822 A1 * | 12/2008 | Kawate et al. | 386/96 |
| 2009/0263103 A1 * | 10/2009 | Mae et al. | 386/95 |

FOREIGN PATENT DOCUMENTS

| | | |
|---|---|---|
| EP | 1921620 A1 | 5/2008 |
| EP | 1995969 A2 | 11/2008 |
| JP | 2003-348514 A | 12/2003 |
| JP | 2006-268219 A | 10/2006 |
| JP | 2008-263491 A | 10/2008 |

* cited by examiner

*Primary Examiner* — Heather Jones
(74) *Attorney, Agent, or Firm* — Canon USA Inc IP Division

(57) ABSTRACT

A recording apparatus includes a recording unit configured to record a moving image signal in a recording medium, a setting unit configured to set a threshold based on a remaining recording capacity of the recording medium, and a control unit configured to control the recording unit to start recording the moving image signal, into a first moving image file in the recording medium, according to a recording instruction, wherein the control unit is configured to control the recording unit to divide the moving image signal into at least a second moving image file in the recording medium in the case that a size of the first moving image file has reached the threshold during recording of the moving image signal according to the recording instruction, and is configured to control the recording unit to delete the moving image file recorded first, from among the plurality of moving image files recorded after the recording instruction, if the remaining recording capacity of the recording medium is determined to have run out during recording of the moving image signal.

7 Claims, 9 Drawing Sheets

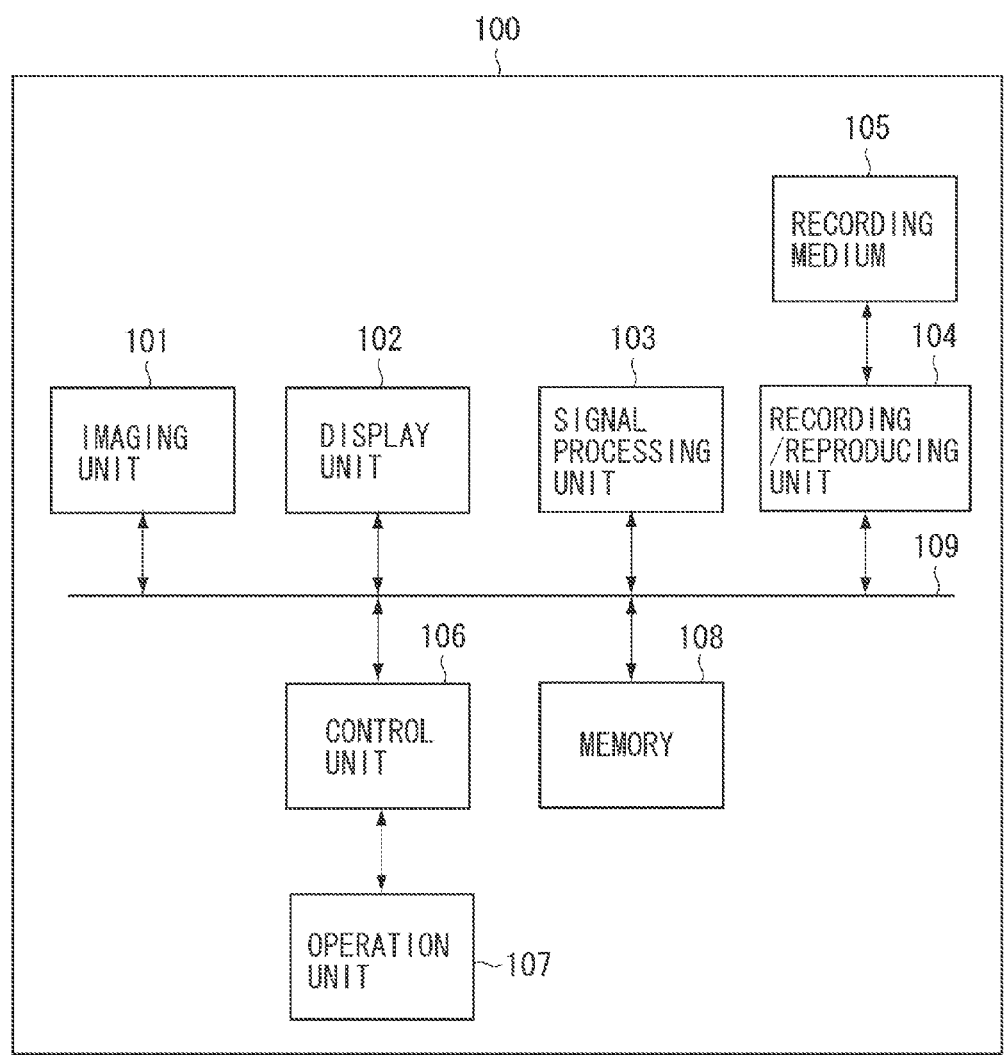

RECORDING APPARATUS

BACKGROUND OF THE INVENTION

1. Field of the Invention

The present invention relates to a recording apparatus.

2. Description of the Related Art

Apparatuses that record an information signal such as a moving image signal in a randomly accessible recording medium such as a hard disk, a memory card, and a digital versatile disc (DVD) and reproduce such an information signal have been known. A home hard disk drive (HDD)/DVD recorder, for example, stores data of TV programs of a predetermined period (several tens of minutes to several hours) in a part of an area in the HDD. Such a hard disk recorder has the function of enabling a user to view stored data of the TV programs later if the user failed to view the programs when they were originally broadcast (see, for example, Japanese Patent Application Laid-Open No. 2003-348514).

A HDD/DVD recorder repeatedly records, as described above, data of a TV program received immediately before in a part of the area in the HDD. On the other hand, in contrast to a home HDD/DVD recorder, some video cameras have no internal HDD. Thus, there is an issue that such a video camera cannot record a scene that a user failed to shoot before a start of shooting.

Thus, for a video camera, storing a moving image immediately before the starting of shooting repeatedly in a memory such as a built-in dynamic random access memory (DRAM) is considered. However, only a scene of several seconds at the longest can be recorded in the memory and a longer scene of several minutes to several tens of minutes cannot be stored. Therefore, it can also be considered that moving images before starting to shoot are repeatedly recorded in a part of a recording area in a replaceable recording medium (e.g. memory card) for recording shot moving images to prevent a failure to shoot.

When a moving image is recorded in a replaceable (preferably randomly accessible) recording medium, as described above, the recorded moving image is normally managed as a file according to a file system such as the File Allocation Table (FAT) file system. If a moving image is managed as a file, moving images may be deleted in units of file (so file by file) when a moving image file is deleted from the recording medium.

In a general-purpose file system such as FAT, an upper limit of a size of a file is set. Thus, if a size of a moving image file currently being recorded reaches the upper limit during shooting, the file being recorded is normally closed and a new file is opened to continue the recording.

Thus, when moving images are repeatedly recorded (or loop recorded) in a part of the recording area in the recording medium, moving images will similarly be recorded by dividing a file if the size of the file reaches the upper limit during recording. More specifically, moving images are sequentially recorded in the part of the recording area for repeated recording and when free space runs out, a moving image recorded first is deleted to record a new moving image in the same area.

At this point, while the moving images are deleted in units of file, the upper limit size of a file is normally set large so e.g. to several GB. Thus, moving images of several minutes to several tens of minutes will be deleted at a time for repeated recording, leading to poor usability.

In recent years, file systems with virtually no upper limit of the file size such as exFAT have emerged. When a repeated recording is performed according to such a file system, moving images after starting the repeated recording will similarly be deleted at a time when free space runs out.

SUMMARY OF THE INVENTION

The present invention is directed to a recording apparatus capable of preventing a failure to record a scene desired by a user and easy for the user to use.

According to an aspect of the present invention, an recording apparatus includes a recording unit configured to record a moving image signal in a recording medium, a setting unit configured to set a threshold based on a remaining recording capacity of the recording medium, and a control unit configured to control the recording unit to start recording the moving image signal, into a first moving image file in the recording medium, according to a recording instruction, wherein the control unit is configured to control the recording unit to divide the moving image signal into at least a second moving image file in the recording medium in the case that a size of the first moving image file has reached the threshold during recording of the moving image signal according to the recording instruction, and is configured to control the recording unit to delete the moving image file recorded first, from among the plurality of moving image files recorded after the recording instruction, if the remaining recording capacity of the recording medium is determined to have run out during recording of the moving image signal.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1 illustrates a configuration of a video camera according to a first exemplary embodiment of the present invention.

DESCRIPTION OF THE EMBODIMENTS

Figure 2A:
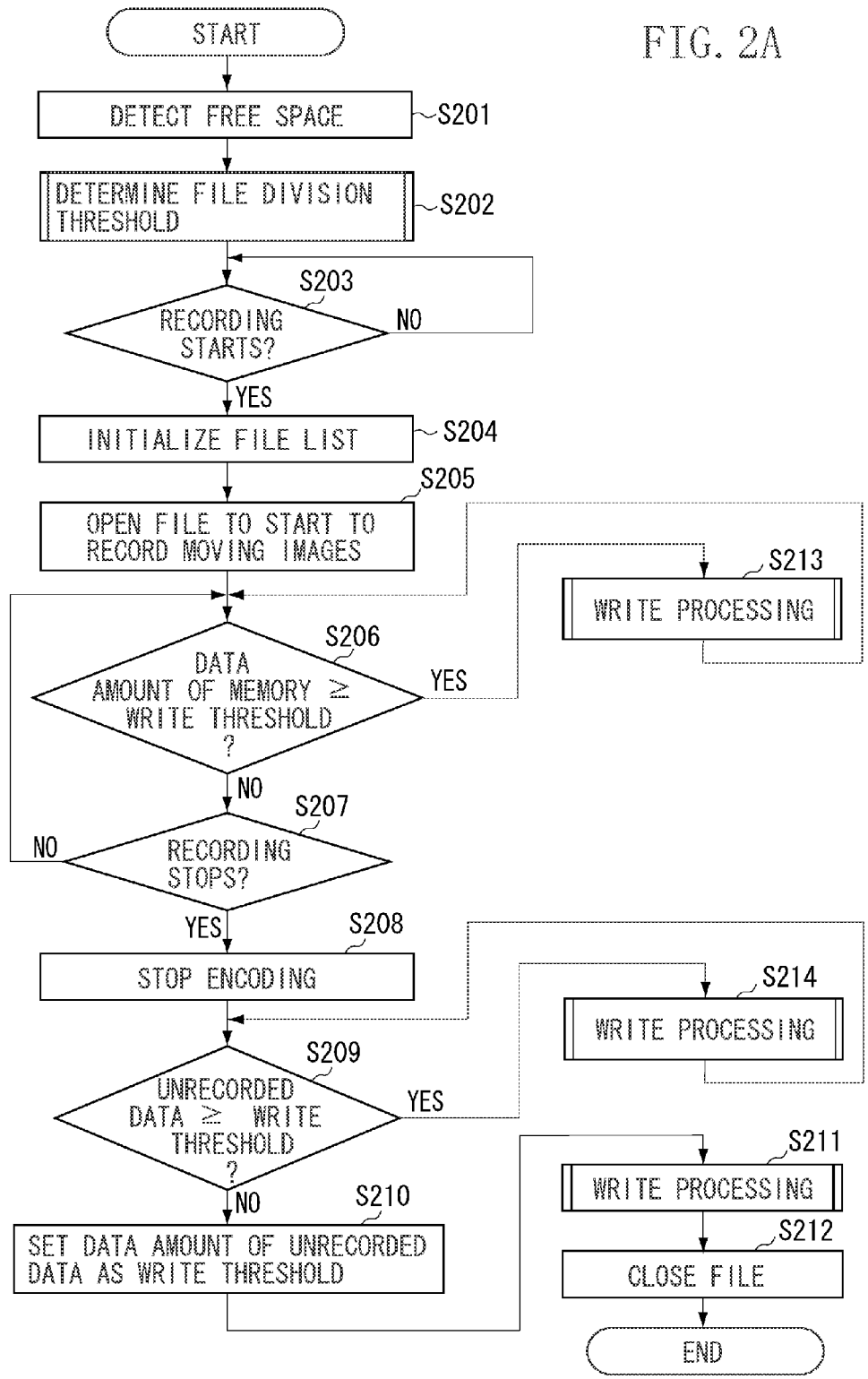
FIG. 2A is a flow chart illustrating processing for loop recording.

Various exemplary embodiments, features, and aspects of the invention will be described in detail below with reference to the drawings.

In a first exemplary embodiment, a case when the present invention is applied to a video camera will be described.

FIG. 1 illustrates a configuration example of a video camera 100 according to the first exemplary embodiment. In FIG. 1, an imaging unit 101 detects (shoots) an image of a subject and outputs a moving image signal. A display unit 102 displays an image of the moving image signal output from the imaging unit 101 or various pieces of information during shooting. The display unit 102 also displays a reproduced moving image or various pieces of information during reproduction. Under instructions from a control unit 106, the display unit 102 displays necessary information such as a menu screen.

A signal processing unit 103 performs necessary processing such as compression processing according to the Moving Picture Expert Group (MPEG) method on the moving image signal output from the imaging unit 101 during shooting and outputs the processed moving image signal to a recording/reproducing unit 104. The signal processing unit 103 performs necessary processing such as decompression processing on a reproduced moving image signal during reproduction and outputs the reproduced moving image signal to the display unit 102. Moreover, the signal processing unit 103 compresses a moving image signal so that a data rate of the compressed moving image signal (so the amount of data per unit time represented by the compressed moving image signal) becomes a target data rate.

The recording/reproducing unit 104 records a moving image signal and other pieces of information in a recording medium 105 and also reproduces a moving image signal and other pieces of information from the recording medium 105. The recording medium 105 is a random access recording medium such as a memory card and a HDD. In the present exemplary embodiment, the recording medium 105 is removable so can be replaced by another recording medium using a mounting/removal mechanism (not illustrated). Also in the present exemplary embodiment, moving images recorded in the recording medium 105 are managed according to the FAT file system and preferably according to FAT32. In addition, the moving images recorded in the recording medium 105 can also be managed by other file systems than FAT.

The control unit 106 includes a central processing unit (CPU) including a microcomputer or the like and a memory and controls each unit of the video camera 100 according to an instruction from an operation unit 107 using an operation program stored in the memory. The control unit 106 also manages the moving image files recorded in the recording medium 105 according to a predetermined file system.

The operation unit 107 includes various switches such as a power switch, a trigger switch that issues an instruction to start/stop shooting, a changeover switch to a reproduction mode, and a menu display switch. A user can issue an instruction of an operation of the video camera 100 such as shooting and reproduction by operating the operation unit 107.

A memory 108 includes a random access memory (RAM) that stores various pieces of information and temporarily stores an input moving image signal and other necessary information. Each of these blocks can exchange data via a bus 109.

The video camera 100 further includes other necessary blocks (units) such as a processing block to acquire and record audio data of a subject and a power block, but a detailed description thereof is omitted.

First, processing for normal shooting will be described. When power is turned on by the operation unit 107, the control unit 106 controls each unit, and brings the video camera 100 into a shooting standby state by displaying a moving image shot by the imaging unit 101 on the display unit 102. If an instruction to start shooting is issued by the operation unit 107 in this state, the control unit 106 controls the signal processing unit 103 and the recording/reproducing unit 104 to compress a moving image signal output from the imaging unit 101 and to record the compressed moving image signal in the recording medium 105.

In the present exemplary embodiment, a moving image signal is recorded in the recording medium 105 as a file. Then, if an instruction to stop shooting is issued by the operation unit 107, the control unit 106 controls each unit to stop recording of moving images in the recording medium 105. In the present exemplary embodiment, a moving image signal of a series of scenes recorded in the recording medium 105 between the instruction to start recording and the instruction to stop recording (referred to as a "shot") is normally managed as a file.

In the present exemplary embodiment, on the other hand, if the size of a moving image file currently being recorded reaches the upper limit size defined by the file system, for example, 4 GB, during shooting of moving images, the file currently being recorded is closed. Then, a new file is automatically opened to store a moving image signal in the new moving image file to allow continuing to shoot. If moving images of a shot (series of scenes) are divided and recorded in a plurality of files in this manner, management information to manage the plurality of moving image files constituting one shot is generated and recorded.

Next, processing for reproduction will be described. If an instruction to switch to the reproduction mode is issued by the operation unit 107, the control unit 106 controls each unit to create a listing screen of representative images (thumbnails) of each shot recorded in the recording medium 105 and to display the listing screen on the display unit 102. Even if one shot is divided into a plurality of moving image files like the above case, one representative image of the shot is displayed, instead of the representative image of each moving image file. The user issues an instruction to start reproduction by selecting the representative image of a desired shot from among representative images displayed on the listing screen of the display unit 102.

The control unit 106 controls the recording/reproducing unit 104 to reproduce the moving image file of the shot corresponding to the representative image instructed by the user. The signal processing unit 103 decompresses a moving image signal included in the reproduced moving image file and outputs the decompressed moving image signal to the display unit 102. The display unit 102 displays the reproduced moving images, instead of the listing screen of representative images. Then, if an instruction to stop reproduction is issued, the listing screen of representative images is displayed again in the display unit 102. If the shot selected by the user is divided and recorded in a plurality of moving image files, the plurality of moving image files is sequentially reproduced from the start of the shot.

Next, a loop recording function will be described. The loop function is a function to perform continuous recording by repeatedly recording a moving image signal in a free space of the recording medium 105 when loop recording is started. If the user issues an instruction to start loop recording by operating the operation unit 107, the control unit 106 controls each unit to start a compression operation of a moving image signal by the signal processing unit 103. Then, the control unit 106 controls the recording/reproducing unit 104 to sequentially write the compressed moving image signal into a free space of the recording medium 105.

At this point, the control unit 106 controls the recording/reproducing unit 104 to sequentially record the moving image signal in the free space of the recording medium 105. When the free space runs out, the control unit 106 returns to the address where the loop recording was started in the recording medium 105 to overwrite the moving image signal previously recorded.

The above processing is repeated until the user issues an instruction to stop recording by operating the operation unit 107. Then, if an instruction to stop recording is issued after starting recording, the control unit 106 stops writing and overwriting the moving image signal to the recording/reproducing unit 104. After the instruction to start loop recording is issued, the control unit 106 instructs the recording medium 105 to record the moving image signals recorded up to that point as they are. However, if the remaining capacity runs out after the loop recording has started, as will be described below, moving images recorded after the loop recording has started are overwritten in chronological order (so earliest first).

Thus, when the loop recording is stopped, the moving images immediately before the recording being stopped for a time corresponding to the free space when the loop recording was started are stored. So in a loop recording mode the video camera is operable to continuously record moving images by repeatedly recording and overwriting moving images representing a particular time period in the recording medium 105, where the time period corresponds to the recording capacity of the recording medium when the start loop recording instruction is given. Upon giving the stop loop recording instruction the overwriting process stops so the moving images recorded on the recording medium at that time are kept. The user can copy a part of the moving images recorded by the loop recording that the user wants to store to another recording medium and then delete the moving images, or delete the moving images other than the part to be stored. Thus, the user can use the recording area in which the moving images are stored by the loop recording again as a free space.

If a size of a moving image file currently being recorded reaches the upper limit size defined in the file system during the loop recording, just like during the normal shooting, the file being recorded is closed to open a new file. If it is assumed that the data rate of the moving images to be recorded is 50 megabit per second and the upper limit size defined in the file system is 4 gigabytes (GB), 4 GB corresponds to moving images of about 11 minutes.

Therefore, if the loop recording is performed in a recording medium whose remaining recording capacity when the loop recording is started is equal to or less than a predetermined value, for example, in the recording medium 105 whose remaining recording capacity is less than 11 minutes, when the remaining capacity runs out, the moving images recorded up to that point are all deleted and then, moving images are recorded again in the same area. Thus, depending on a timing when the instruction to stop the loop recording is issued, the function of the loop recording may not effectively be used.

Thus, in the present exemplary embodiment, an upper limit of the file size is set based on the remaining capacity of the recording medium when the loop recording is started regardless of the upper limit of the file size defined in the file system.

FIG. 2A is a flow chart illustrating processing for loop recording. The processing in FIG. 2A is performed by the control unit 106 controlling each unit of the video camera 100.

Processing illustrated in the flow is started after power is turned on and an instruction to set the loop recording function or mode is issued in a shooting standby state.

First, in step S201, the control unit 106 detects the remaining recording capacity of the recording medium 105 based on management information read from the recording medium 105. In step S202, the control unit 106 determines a file division threshold based on the remaining capacity of the recording medium 105. The file division threshold is an upper limit size of a moving image signal that can be recorded in one file when the loop recording is performed. Threshold setting processing for file division will be described below.

Next, in step S203, the control unit 106 waits for an instruction from the user to start recording of moving images. If the instruction to start recording is received from the user by operating the operation unit 107 (YES in step S203), then in step S204, the control unit 106 initializes a file list.

Figure 3:
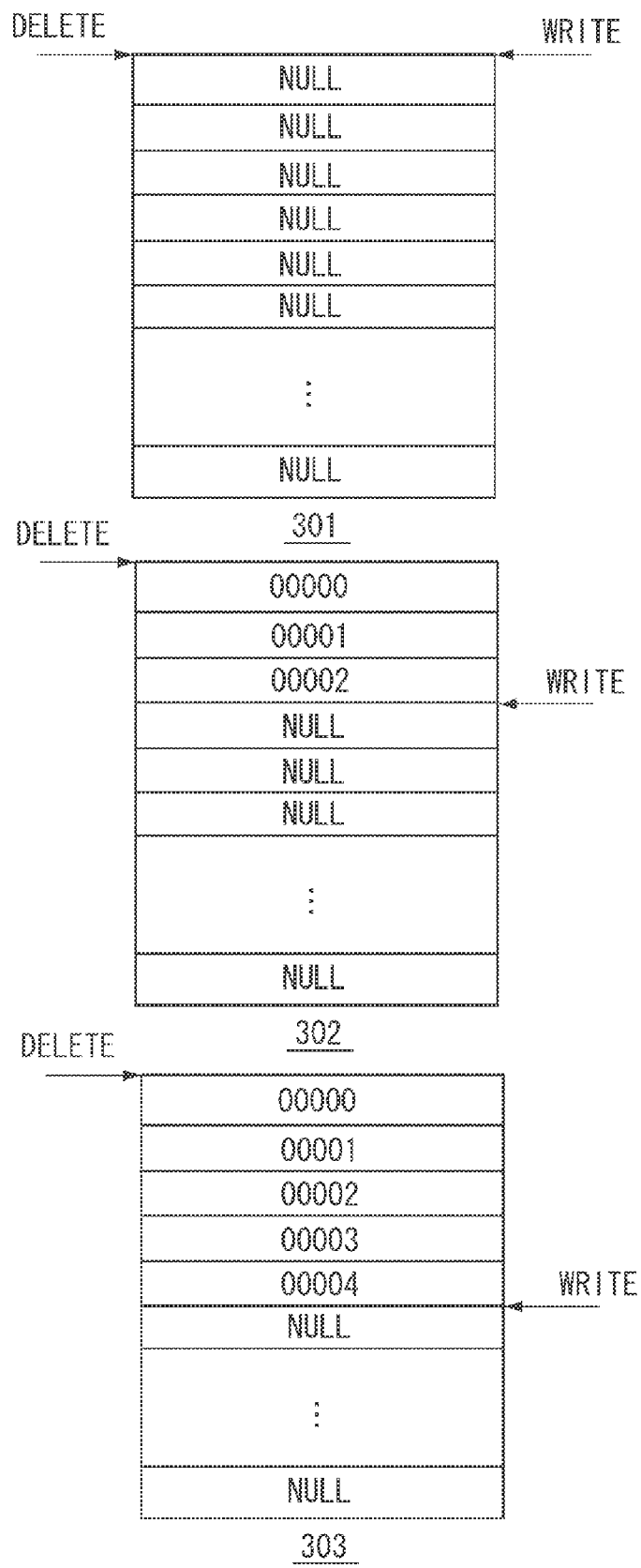
FIG. 3 illustrates an output file list.

FIG. 3 is an example of the file list used for loop recording. When the loop recording mode is set, the control unit 106 generates a file list and stores the file list in the memory 108. The file list includes recorded file names (or a portion thereof) and a pointer (write pointer) indicating a file recorded in the recording medium 105 among files registered in the list. The file list also includes a pointer (delete pointer) indicating how far recorded files are deleted and thus includes two pointers. In step S204, as illustrated in a file list 301 in FIG. 3, file names are all set to NULL and unregistered and both pointers are fixed to the head of the file list.

Next, in step S205, the control unit 106 opens a new file in recording medium 105 to start recording of a moving image signal. The signal processing unit 103 encodes a captured moving image signal and stores the signal in the memory 108 until the instruction to stop the recording from the control unit 106 is received. The signal processing unit 103 also notifies the control unit 106 of a size (data amount) of the encoded moving image signal stored in the memory 108.

Next, the control unit 106 detects the data amount of the encoded moving image signal stored in the memory 108 based on the notification from the signal processing unit 103. Then, in step S206, the control unit 106 determines whether the data amount of the moving image data stored in the memory 108 is equal to or more than the write threshold. If the data amount of the moving image data stored in the memory 108 is equal to or more than the write threshold (YES in step S206), then in step S213, the control unit 106 performs write processing into the already opened file in the recording medium 105.

The write threshold is the size (data amount) of the encoded moving image signal stored in the memory 108 to be written into the recording medium 105 by a single write processing. In the present exemplary embodiment, the data rate at which data can be written into the recording medium 105 is higher than that of the encoded moving image signal. Thus, the encoded moving image signal is once stored in the memory 108 by the signal processing unit 103. Then, each time the encoded moving image signal corresponding to the write threshold is stored in the memory 108, the recording/reproducing unit 104 reads the encoded moving image signal corresponding to the write threshold from the memory 108 and writes it into the recording medium 105.

When the write processing is completed, recording of the moving image signal in the recording medium 105 is stopped until the moving image signal corresponding to the write threshold is stored again in the memory 108. In this manner, the moving image signal is intermittently recorded in the recording medium 105.

Figure 2B:
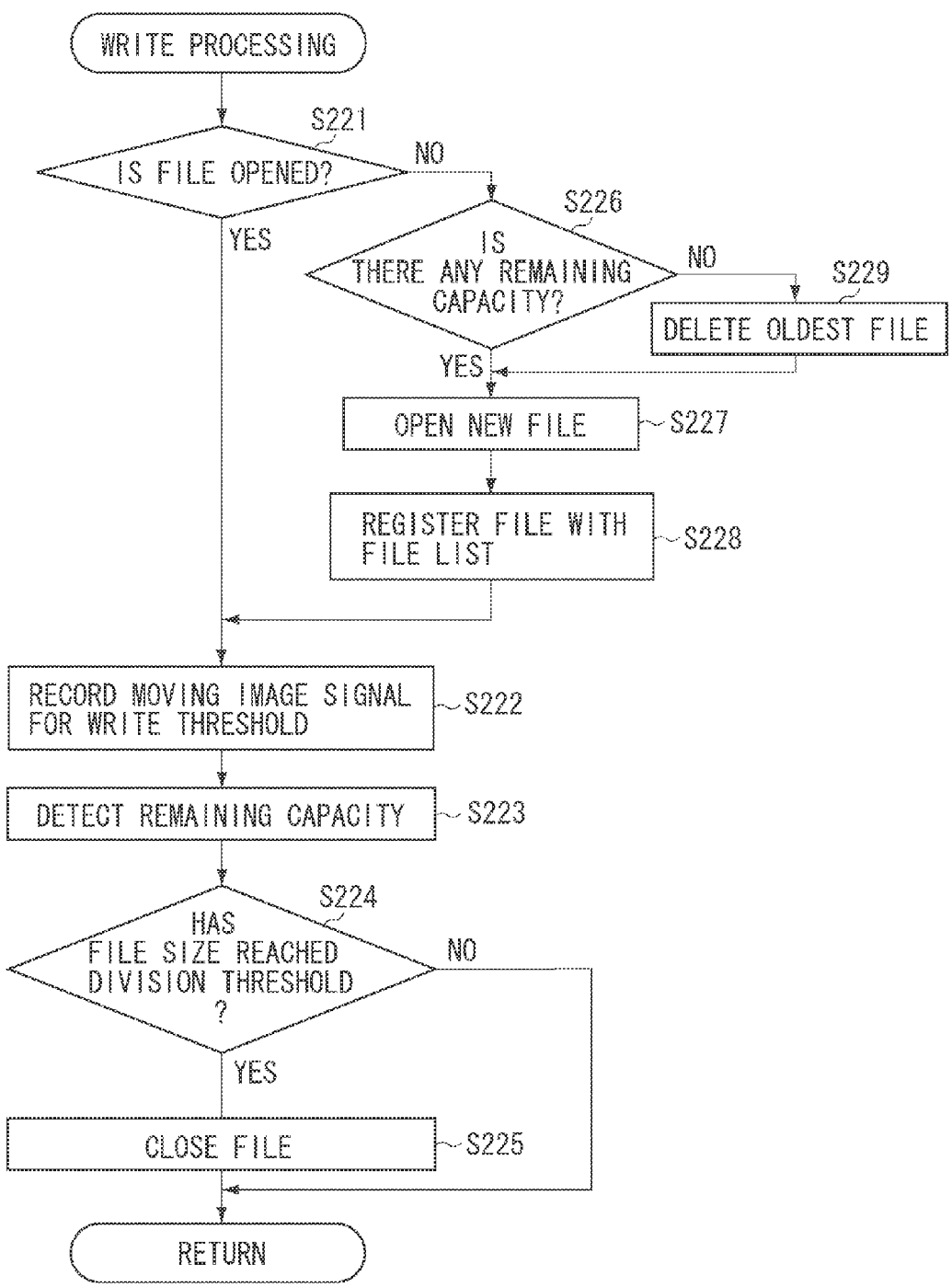
FIG. 2B is a flowchart illustrating write processing.

FIG. 2B is a flow chart illustrating the write processing in step S213 in FIG. 2A.

First, in step S221, the control unit 106 checks whether a moving image file to store a moving image signal is opened in recording medium 105. If the moving image file is already opened (YES in step S221), then in step S222, the control unit 106 instructs the recording/reproducing unit 104 to read a moving image signal corresponding to the write threshold of the encoded moving image signal stored in the memory 108 and to record the moving image signal in the open file in recording medium 105.

Next, in step S223, the control unit 106 detects the remaining recording capacity of the recording medium 105 after the write processing. Next, in step S224, the control unit 106 detects whether the size of the moving image file being recorded in recording medium 105 has reached a file division threshold. If the size has reached the file division threshold (YES in step S224), the control unit 106 closes the moving image file being recorded. On the other hand, if the size has not reached the file division threshold (NO in step S224), the control unit 106 terminates this instance of write processing without closing the file being recorded.

If no moving image file is opened (NO in step S221), then in step S226, the control unit 106 detects the remaining capacity of the recording medium 105 to determine whether there is any remaining capacity of the recording medium 105 (or may use the remaining recording capacity detected in step S223). If it is determined that there is a remaining capacity of the recording medium 105 (YES in step S226), in step S227, the control unit 106 opens a new moving image file. Next, in step S228, the control unit 106 registers the newly opened moving image file in the file list (stored in memory 108). A file list 302 in FIG. 3 illustrates an example of the file list when a file is registered. When a file is registered, the file name (or a portion thereof) of the opened file is registered in the table and the write pointer is moved forward by one step.

If the control unit 106 determines that there is no remaining capacity of the recording medium 105 (NO in step S226), in step S229, the control unit 106 deletes a moving image file recorded in the recording medium 105 based on the file list. In this case, the control unit 106 deletes the oldest file among the moving image files recorded in the recording medium 105 at that point after starting the current loop recording (so the file recorded earliest since starting this instance of loop recording). A file list 303 in FIG. 3 illustrates an example of the file list when a file is deleted. When a file is deleted, the file registered at the delete pointer is deleted to secure a free space of the deleted file in the recording medium 105 and the delete pointer is moved forward by one step.

In this manner, write processing of the moving image signal corresponding to the write threshold stored in the memory 108 is performed. Then, the processing proceeds to step S207 in FIG. 2A, the control unit 106 determines whether an instruction to stop the recording has been received from the operation unit 107 in a state that the data amount of the encoded moving image signal stored in the memory 108 is smaller than the write threshold. When the instruction to stop the recording is received, in step S208, the control unit 106 stops encoding processing of the moving image signal by the signal processing unit 103. Then, in step S209, the control unit 106 determines whether the data amount of the encoded moving image signal stored in the memory 108 is equal to or larger than the write threshold.

If the data amount of the encoded moving image signal stored in the memory 108 is equal to or larger than the write threshold (YES in step S209), in step S214, the control unit 106 performs the write processing illustrated in FIG. 2B, and then, the processing returns to step S209. If the data amount of the encoded moving image signal stored in the memory 108 is less than the write threshold (NO in step S209), in step S210, the control unit 106 sets the size of the unregistered encoded moving image signal stored in the memory 108 at that point as the write threshold. Then in step S211, the control unit 106 performs the write processing illustrated in FIG. 2B. Then, in step S212, the control unit 106 closes the moving image file being recorded.

Next, setting processing of the file division threshold in step S202 will be described.

Figure 4:
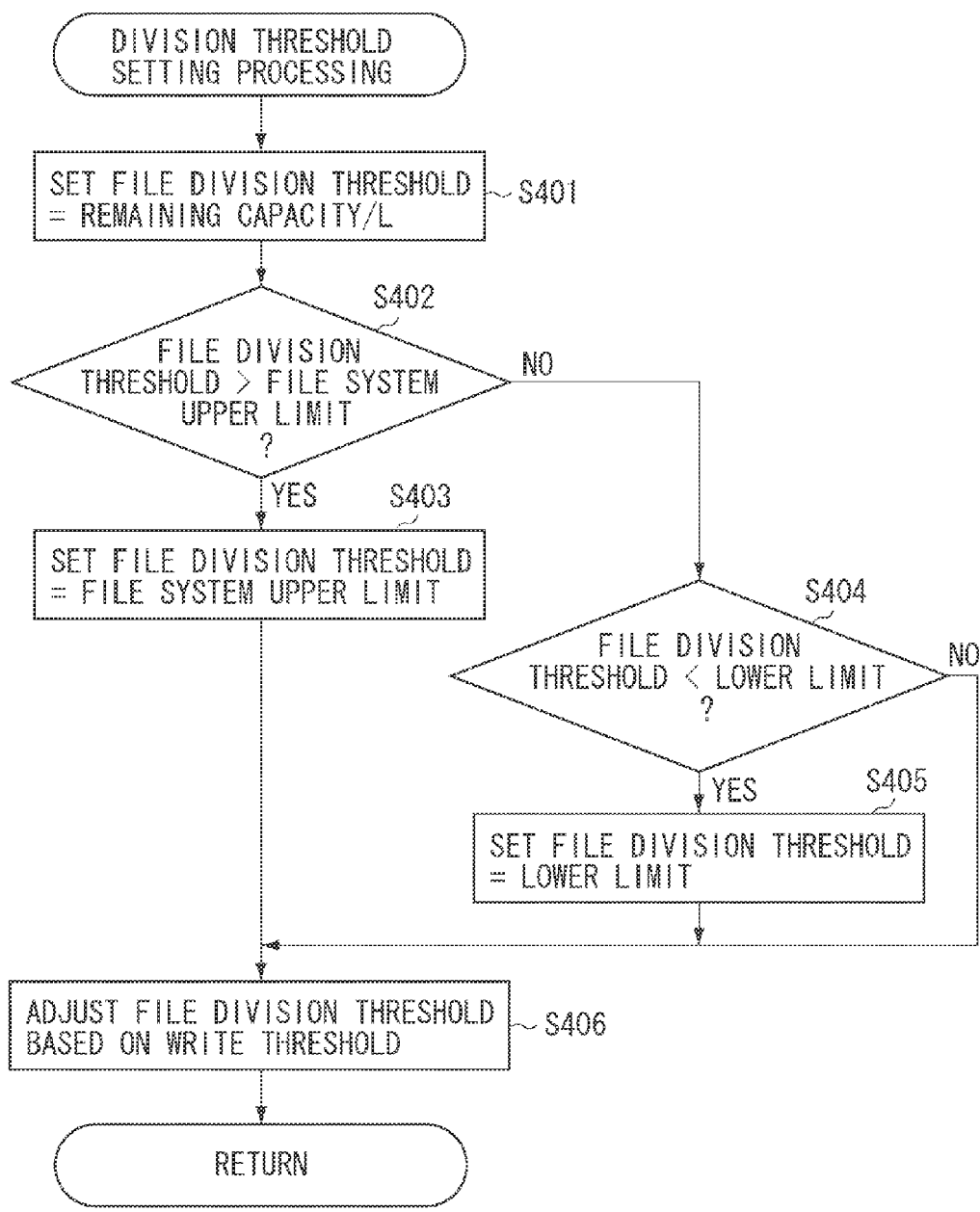
FIG. 4 is a flow chart illustrating division size setting processing.

FIG. 4 is a flow chart illustrating details of processing in step S202 in FIG. 2. First, in step S401, the control unit 106 sets a value obtained by dividing the remaining capacity of the recording medium 105 by a predetermined value L (L is an integer equal to or greater than 2) as a provisional file division threshold. The predetermined value L is determined based on a data amount to be recorded in the recording medium 105 during loop recording.

If, for example, L=5 is set, the size obtained by dividing the remaining capacity by 5 becomes the file division threshold. Then, as will be described below, each time five moving image files are recorded after starting the loop recording, the loop recording will be continued by automatically deleting the oldest moving image file. Thus, if L=5 is set, moving image data corresponding to 4/5 of the remaining capacity will securely be recorded during the loop recording. If L=3, the size obtained by dividing the remaining capacity by 3 becomes the file division threshold. Thus, if L=3 is set, moving image data corresponding to 2/3 of the remaining capacity will securely be recorded during the loop recording.

If the remaining capacity of the recording medium when the loop recording is started is 60 GB, the file division thresholds will be calculated as follows:

(If $L$=5) 60 GB/5=12 GB (If $L$=3) 60 GB/3=20 GB

In the present exemplary embodiment, it is assumed that the proportion of moving images to be saved with respect to the remaining capacity after starting the loop recording can be set. If, for example, moving images immediately before the stop instruction which corresponds to 2/3 of moving images that can be stored in the remaining capacity would be saved, the predetermined value L becomes 3. For a proportion that can be set, in the present exemplary embodiment, a user can select from predetermined proportions such as 4/5, or 2/3.

Next, in step S402, the control unit 106 compares the file division threshold determined in step S401 with the upper limit of the file size defined in the file system to determine whether the file division threshold is larger than the upper limit of the file system. If, for example, FAT32 is used as the file system, the upper limit of the size of one file is 4 GB. If, as a result of the comparison, the file division threshold calculated in step S401 is larger than the upper limit defined in the file system (YES in step S402), in step S403, the control unit 106 sets the upper limit of the file system as the file division threshold.

If, as a result of the comparison in step S402, the file division threshold calculated in step S401 is smaller than the upper limit defined in the file system (NO in step S402), in step S404, the control unit 106 determines whether the set threshold is smaller than the lower limit. The lower limit is a predetermined value and no restriction is imposed thereon. However, generation of too small file may lead to poor handling or shortening of moving images recorded in one file. Thus, in the present exemplary embodiment, the lower limit of the file division threshold is set. As the lower limit, for example, the size corresponding to a length of several minutes at a target data rate of moving images will be set.

If the file division threshold is smaller than the lower limit (YES in step S404), then in step S405, the control unit 106 sets the lower limit as the file division threshold. If the processing in steps S403 to S405 is completed, in step S406, the control unit 106 adjusts the file division threshold so that the size thereof is an integral multiple of the write threshold and also a maximum value of sizes smaller than the file division threshold. Accordingly, no file exceeding the file division threshold will be generated in the write processing illustrated in FIG. 2B.

Figure 5:
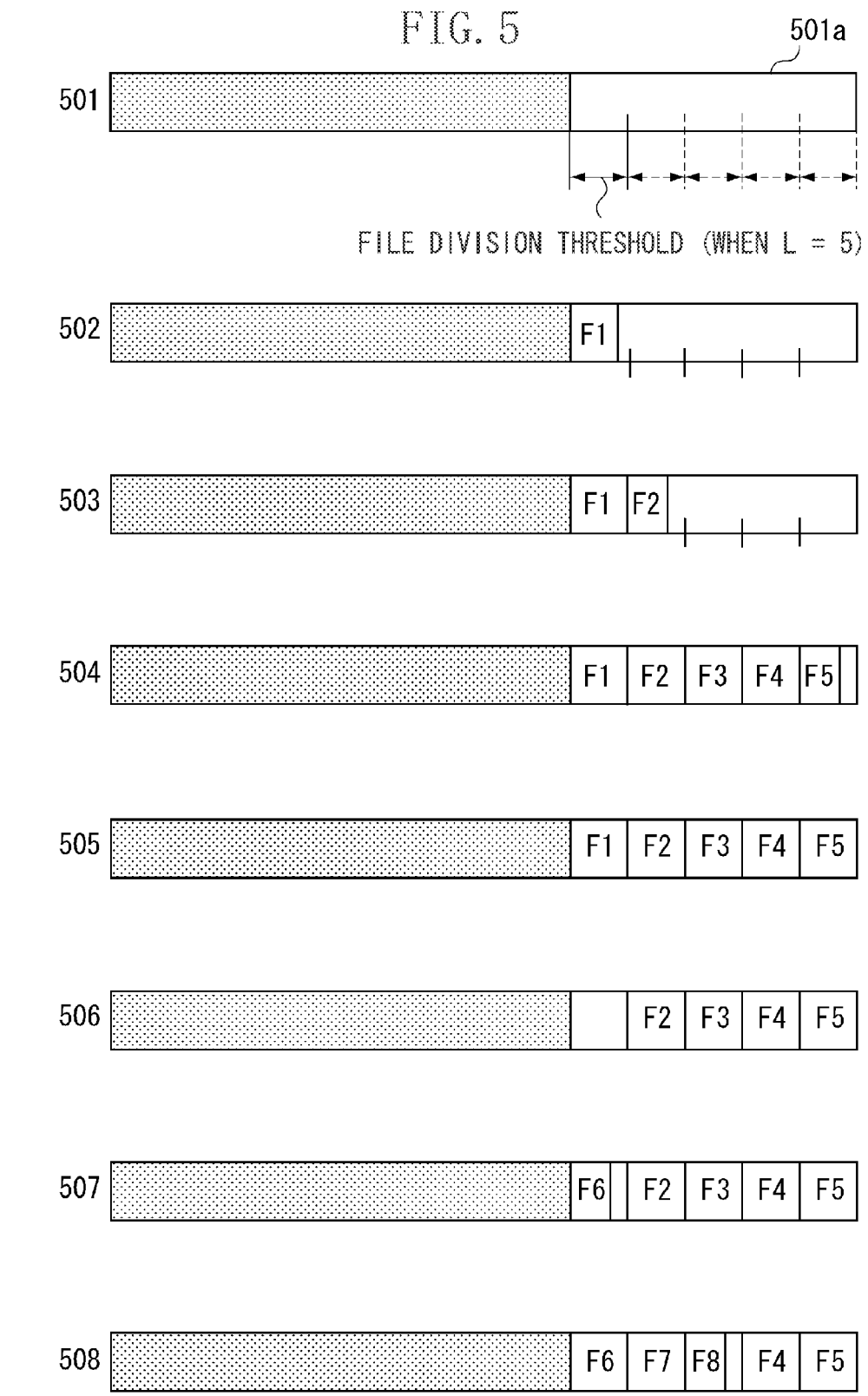
FIG. 5 illustrates a state of data on a recording medium for loop recording.

FIG. 5 illustrates states how moving image files are recorded in the recording medium 105 for loop recording.

A state 501 in FIG. 5 illustrates a state before recording of moving images by loop recording is started. In the state 501, moving image data is already recorded in a (shaded) portion of the recording medium 105 when the loop recording is started. Thus, moving images are recorded using a free space 501a of the recording medium 105 in the loop recording. As an example, the file division threshold when L=5 is determined.

A state 502 illustrates the recording medium 105 immediately after the loop recording is started. In the state 502, a first moving image file F1 is opened to record a moving image signal. A state 503 illustrates a state in which a size of the moving image file F1 exceeds or reaches the file division threshold, so that the file F1 is closed, and a new moving image file F2 is automatically opened to continue the recording.

A state 504 illustrates a state in which the recording is continued until immediately before the remaining capacity runs out. A state 505 illustrates a state in which a file F5 reaches the file division threshold and the remaining capacity of the recording medium 105 has run out. A state 506 illustrates a state in which since the remaining capacity has run out, the oldest file F1 is deleted among the files F1 to F5 recorded after starting the loop recording. A state 507 illustrates a state in which a new file F6 is opened to record a moving image signal therein. A state 508 illustrates a state in which the files F1, F2, and F3 are deleted and the files F4, F5, F6, F7, and F8 are recorded that are data immediately before (so running up to) the time at which recording is stopped.

As described above, the video camera 100 in the present exemplary embodiment can set a file division threshold based on a remaining recording capacity of a recording medium during loop recording. Further, the video camera 100 performs recording while dividing a moving image file according to the set threshold. If the remaining capacity of the recording medium runs out, the video camera 100 continues the recording operation by deleting the oldest file. Thus, when the loop recording is stopped, data immediately before the stop can securely be recorded in the recording medium.

Moreover, the video camera 100 in the present exemplary embodiment can set 1/L of the remaining capacity as a threshold. Once L moving image files have been recorded during loop recording, the video camera 100 deletes the moving image file recorded first to continue recording of a new moving image file. Thus, when the loop recording is stopped, data immediately before the stop can securely be recorded in the recording medium.

While a moving image file is managed according to the FAT file system in the present exemplary embodiment, other file systems can also be used. Moreover, a moving image is compressed and recorded by the MPEG method in the present exemplary embodiment, but other compression methods can also be used.

If a file system with virtually no upper limit of a file size such as exFAT is used, the processing in steps S402 and S403 is eliminated from the setting processing of the division threshold illustrated in FIG. 4.

When a file division threshold is set for loop recording, instead of a predetermined value L being directly set by a user, a recording time period by loop recording may be presented to the user so that the user may change the recording time period while checking the recording time period to change the value L.

More specifically, the control unit 106 calculates a recordable time period of the moving images that can be recorded in a free space of the recording medium 105 (so the time period represented by the moving images that can be recorded in the free space of the recording medium) based on the remaining capacity of the recording medium 105 and the data rate of moving image data. Then, based on the predetermined value L set at that point, the control unit 106 displays (L−1)/L of the calculated recordable time period as loop recording time period on the display unit 102. The user can increase or decrease the loop recording time period by operating the operation unit 107. The control unit 106 changes the value of L according to an increase/decrease of the loop recording time period by the user.

For example, each time the user performs an operation to issue an instruction to increase the loop recording time period, the control unit 106 increments the value of L by one. If the user issues an instruction to increase the loop recording time period while L=5 is set, the control unit 106 changes L to 6. Accordingly, the file division threshold is changed from ⅕ to ⅙ of the size of the remaining capacity and the loop recording time period is changed from ⅘ to ⅚ of the time period recordable in a free space.

If, for example, the time period recordable in a free space is 30 minutes and L is set to 5, the recording time period by loop recording will be 30*(⅘)=24 minutes. If an instruction to increase the loop recording time period is issued by the user in this state, the recording time period by the loop recording changes to 30*(⅚)=25 minutes by setting L to 6.

Thus, by presenting the recording time period by the loop recording to the user, the user can easily set the loop recording time period, so that the file division threshold for loop recording can be set.

If L=2 has been set, the value L cannot be decreased more and thus, the recording time period by loop recording can no longer be shortened by changing L. Thus, in such a case, the loop recording time period and the file division threshold will be set according to a second exemplary embodiment described below.

In the first exemplary embodiment, the file division threshold is determined based on the remaining capacity of the recording medium. In a second exemplary embodiment, the recording apparatus is configured to enable a user to set the time period of moving images to be stored when loop recording is stopped and to determine a file division threshold based on the time period specified by the user. The configuration of the video camera 100 according to the present exemplary embodiment is the same as that in the first exemplary embodiment, and thus a detailed description thereof will not be repeated. While basic processing during loop recording is similar to the operation illustrated in FIG. 2A, the setting processing of the file division threshold in step S202 and the write processing in steps S211, S213, and S214 are different from those in the first exemplary embodiment.

Figure 7:
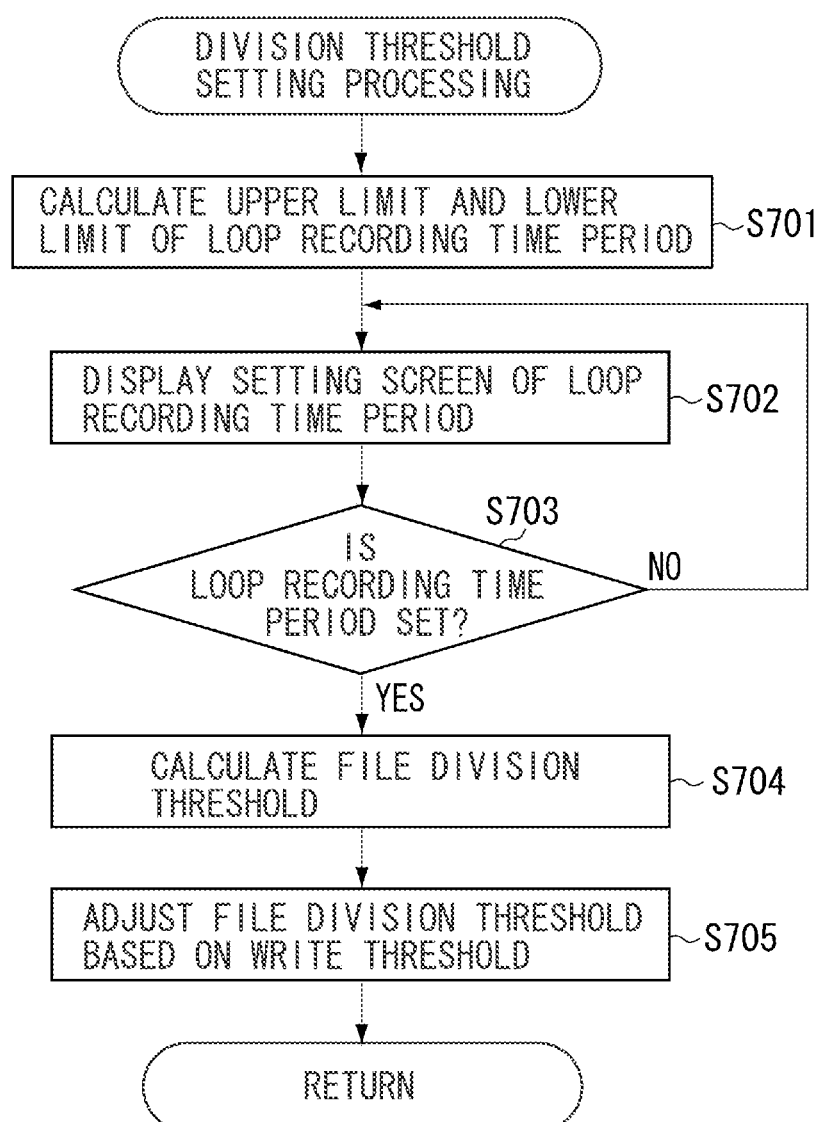
FIG. 7 is a flow chart illustrating division size setting processing.

FIG. 7 is a flow chart illustrating the setting processing of the file division threshold according to the second exemplary embodiment. When an instruction to specify recording time period of moving images for loop recording is issued via the operation unit 107, the processing is started. First, in step S701, the control unit 106 calculates the upper limit and the lower limit of the loop recording time period that can be set.

More specifically, the control unit 106 select the larger of half the size of a free space of the recording medium 105 and a size defined by the file system as the upper limit. Then, the control unit 106 calculates the upper limit of the recording time period that can be set as the loop recording time period by dividing the size of the selected upper limit by the data rate of a moving image signal to be recorded in the recording medium 105. The control unit 106 sets the same value as that in the first exemplary embodiment as the lower limit. Then, based on the lower limit and the data rate of a moving image signal, the control unit 106 calculates the lower limit of the time period that can be set as the loop recording time period.

Next, in step S702, the control unit 106 displays a setting screen for setting the recording time period by the loop recording including information about the upper limit of the loop recording time period and the lower limit of the loop recording time period calculated as described above on the display unit 102. A user can set the recording time period of moving images for loop recording by operating the operation unit 107 while viewing the setting screen. Next, in step S703, the control unit 106 determines whether the loop recording time period is set. In the present exemplary embodiment, control is performed so that when an instruction to stop the loop recording is issued, moving images corresponding to the loop recording time period set by the user immediately before the stop are recorded in the recording medium.

If the loop recording time is set (YES in step S703), in step S704, the control unit 106 calculates the file division threshold based on the set time and the data rate of a moving image signal. Then, in step S705, the control unit 106 adjusts the file division threshold so that the size thereof is an integral multiple of the write threshold and also the maximum value of sizes smaller than the file division threshold.

Figure 6:
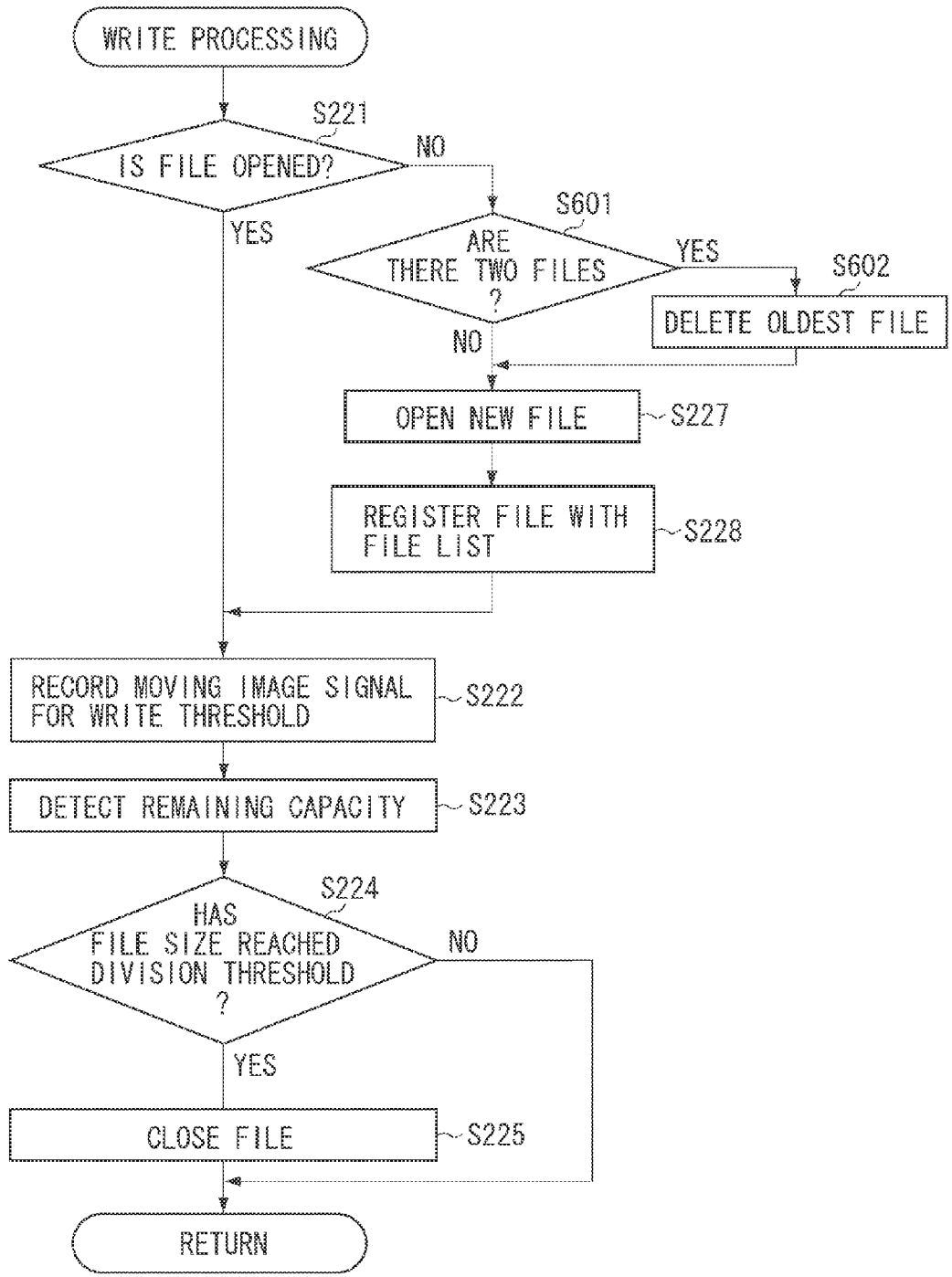
FIG. 6 is a flowchart illustrating write processing.

FIG. 6 is a flow chart illustrating the write processing in the present exemplary embodiment. In FIG. 6, except steps S601 and S602, steps with the same numbers in the flowchart in FIG. 2B have the same content as those in the first exemplary embodiment and thus, descriptions thereof will not be repeated.

If the control unit 106 determines that the moving image file is not opened (NO in step S221), in step S601, the control unit 106 determines whether two moving image files recorded after starting the loop recording are stored in the recording medium 105. If, at this point, two moving image files are recorded in the recording medium 105 (YES in step S601), in step S602, the control unit 106 deletes the moving image file recorded previously of the two moving image files from the recording medium 105. Then, in step S227, the control unit 106 opens a new moving image file.

On the other hand, if there is only one moving image file recorded after starting the loop recording in the recording medium 105 (NO in step S601), in step S227, the control unit 106 opens a new moving image file without deleting the recorded moving image file. Thus, in the second exemplary embodiment, each time two files are recorded in the recording medium 105, the file recorded previously of the two files is deleted from the recording medium 105.

Figure 8:
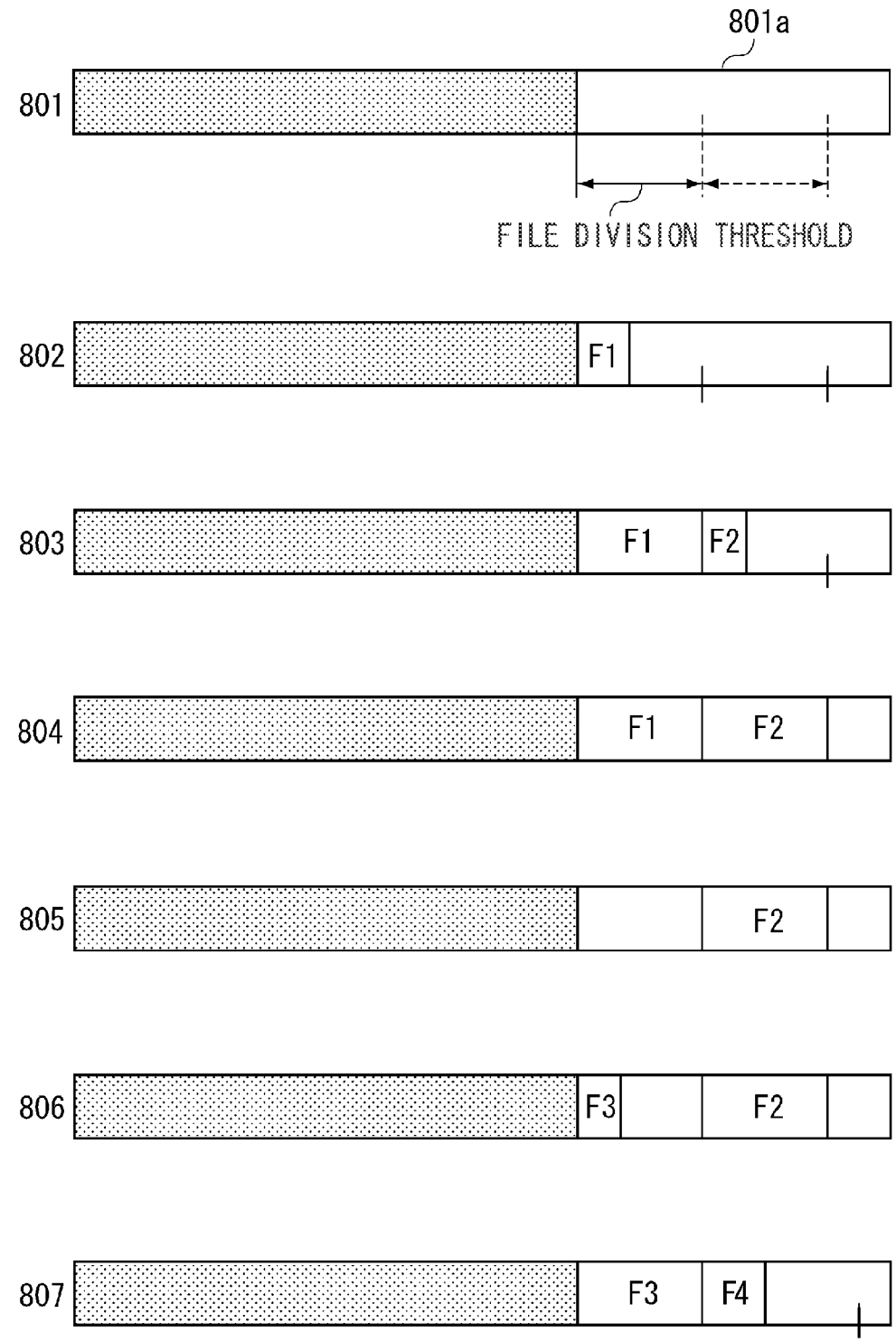
FIG. 8 illustrates a state of data on a recording medium for loop recording.

FIG. 8 illustrates states how moving image files are recorded in the recording medium 105 for loop recording.

A state 801 illustrates a state before a recording is started. In the state 801, moving image data is already recorded in a portion of the recording medium 105 when the loop recording is started. Thus, moving image data immediately before the start of the loop recording is recorded using a free space 801a of the recording medium 105.

A state 802 illustrates a state of the recording medium 105 immediately after the loop recording is started. In the state 802, a first moving image file F1 is opened to record a moving image signal.

A state 803 illustrates a state in which a size of the moving image file F1 exceeds or reaches the file division threshold, so that the file F1 is closed, and a new moving image file F2 is opened to continue the recording. When the recording of the moving image file F2 is started, the only one moving image file F1 is recorded, and thus the moving image file F2 is opened without deleting the moving image file F1.

A state 804 illustrates a state in which a size of the moving image file F2 reaches the file division threshold. A state 805 illustrates a state in which the recording of moving images is further continued in the state 804. In the state 804, the two moving image files F1 and F2 are already recorded after the loop recording is started. Thus, the moving image file F1 recorded previously of these two files is deleted. Then, as illustrated in a state 806, a new moving image file F3 is opened to continue the recording. A state 807 illustrates a state in which the recording is further continued from the state 806 and after the size of the moving image file F3 reaches the upper limit of the file division and the moving image file F4 is opened, then an instruction to stop the loop recording is issued.

Thus, in the present exemplary embodiment, the upper limit of the recording time period for loop recording is determined based on the remaining capacity when the loop recording is started. Then, a user can set the recording time period for loop recording within the time up to the upper limit, and based on the set recording time period, the file division threshold for loop recording is set. Then, each time two moving image files are recorded during loop recording, the moving image file recorded previously is deleted to continue the recording of new moving images. Accordingly, the time that the user wants to record can be set at the time of loop recording.

In the first and second exemplary embodiments, a case where the present invention is applied to a video camera has been described, but the present invention can similarly be applied to any apparatus that records moving images as a file.

The present invention can also be realized by performing processing described above. More specifically, software (a computer program) for realizing the functions of the above exemplary embodiments may be supplied to a system or an apparatus via a network or various computer-readable storage media. The program may thus be carried on a carrier medium such as a computer readable storage medium or transmission medium (signal). Then, a computer (or a CPU or micro processing unit (MPU)) of the system or the apparatus reads and executes the program.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-285563 filed Dec. 16, 2009, which is hereby incorporated by reference herein in its entirety.

What is claimed is:

1. A recording apparatus, comprising:
a recording unit configured to record a moving image signal in a recording medium by storing the moving image signal in a moving image file in accordance with a file system,
wherein the recording unit starts recording the moving image signal in accordance with a recording start instruction and stops recording of the moving image signal in accordance with a recording stop instruction,
wherein the moving image signal recorded in the recording medium is deleted in units of the moving image file and a recording area in which a moving image signal stored in the deleted moving image file had been recorded is managed as a remaining capacity of the recording medium; and a control unit configured to control, in a loop recording mode, the recording unit to repeatedly record the moving image signal in a predetermined recording area for the loop recording mode in a period from the recording start instruction to the recording stop instruction, by dividing the moving image signal into a predetermined number of moving image files, wherein the control unit determines an upper limit of a file size of each of the predetermined number of moving image files to be recorded in the loop recording mode, according to a recording capacity of the predetermined recording area, wherein in the loop recording mode, the control unit controls the recording unit to divide the moving image file every time a file size of the moving image file being recorded reaches the upper limit so that the file size of each of the predetermined number of moving image files recorded in the loop recording mode does not exceed the upper limit and the moving image signal of a recording time length corresponding to the file size of the upper limit is stored in each of a plurality of moving image files, each of which has the file size of the upper limit, and has been recorded in the loop recording mode, wherein each of the predetermined number of moving image files recorded in the loop recording mode is managed as a file according to the file system, and wherein if a remaining capacity of the predetermined recording area is determined to have run out in the loop recording mode, the control unit controls the recording unit to delete a moving image file recorded first, from among the predetermined number of moving image files recorded after the recording start instruction in the loop recording mode so that a remaining capacity corresponding to the file size of the upper limit is obtained, and to continue recording the moving image signal in a recording area, which has a capacity corresponding to the file size of the upper limit and in which the moving image signal stored in the deleted moving image file had been recorded.

2. The recording apparatus according to claim 1, wherein the control unit determines the upper limit of the file size of each of the predetermined number of moving image files in accordance with a value obtained by dividing the recording capacity of the predetermined recording area by the predetermined number.

3. The recording apparatus according to claim 1, wherein the control unit sets a maximum file size defined by the file system as a maximum value of the upper limit.

4. The recording apparatus according to claim 1, further comprising:

a display unit configured to display a recording time length of the moving image signal to be recorded in the loop recording mode, based on the recording capacity of the predetermined recording area; and an operation unit operable by a user to change the recording time length displayed in the display unit, wherein the control unit changes the upper limit in accordance with the recording time length changed by an operation by the user.

5. The recording apparatus according to claim 1, wherein the control unit determines 1/L, L being an integer equal to or greater than 2, of the recording capacity of the predetermined recording area as the upper limit.

6. The recording apparatus according to claim 1, wherein the control unit controls the recording unit to stop recording the moving image file being recorded and generate a new moving image file every time the file size of the moving image file being recorded reaches the upper limit in a period from the recording start instruction to the recording stop instruction.

7. A method of controlling a recording apparatus, comprising the steps of:

recording a moving image signal in a recording medium by storing the moving image signal in a moving image file in accordance with a file system, wherein the step of recording starts recording the moving image signal in accordance with a recording start instruction and stops recording the moving image signal in accordance with a recording stop instruction, wherein the moving image signal recorded in the recording medium is deleted in units of the moving image file and a recording area in which a moving image signal stored in the deleted moving image file had been recorded is managed as a remaining capacity of the recording medium; and in a loop recording mode, repeatedly recording the moving image signal in a predetermined recording area for the loop recording mode in a period from the recording start instruction to the recording stop instruction, by dividing the moving image signal into a predetermined number of moving image files;

determining an upper limit of a file size of each of the predetermined number of moving image files to be recorded in the loop recording mode, according to a recording capacity of the predetermined recording area, wherein in the loop recording mode, controlling to divide the moving image file every time a file size of the moving image file being recorded reaches the upper limit so that the file size of each of the predetermined number of moving image files recorded in the loop recording mode does not exceed the upper limit and the moving image signal of a recording time length corresponding to the file size of the upper limit is stored in each of a plurality of moving image files, each of which has the file size of the upper limit, and has been recorded in the loop recording mode, wherein each of the predetermined number of moving image files recorded in the loop recording mode is managed as a file according to the file system; and in a case that a remaining capacity of the predetermined recording area is determined to have run out in the loop recording mode; deleting a moving image file recorded first, from among the predetermined number of moving image files recorded after the recording start instruction in the loop recording mode so that a remaining capacity corresponding to the file size of the upper limit is obtained, and to continue recording the moving image signal in a recording area, which has a capacity corresponding to the file size of the upper limit and in which the moving image signal stored in the deleted moving image file had been recorded.

* * * * *